United States Patent Office

3,485,587
Patented Dec. 23, 1969

3,485,587
PROTEIN INDICATOR
Albert S. Keston, Weehawken, N.J., assignor to Miles Laboratories, Inc., Elkhart, Ind., a corporation of Indiana
No Drawing. Application Aug. 21, 1958, Ser. No. 756,293, which is a continuation-in-part of application Ser. No. 568,437, Feb. 29, 1956. Divided and this application Mar. 20, 1969, Ser. No. 808,993
Int. Cl. G01n 31/22, 33/16
U.S. Cl. 23—230                10 Claims

ABSTRACT OF THE DISCLOSURE

A diagnostic indicator useful in determining the presence and amount of protein (albumin) in a liquid such as urine is provided. In preferred form the indicator is a piece of absorbent paper which has deposited on it (1) a polychromatic substance adapted to change color on reaction with protein and (2) a solid buffer material which serves to prevent color changes in the polychromatic substance due to a substantial shift in pH.

---

This application is a divisional application of my copending application Ser. No. 756,293 which was filed on Aug. 21, 1958 as a continuation-in-part of my prior copending application Ser. No. 568,437 which was filed Feb. 29, 1956 (now abandoned).

This invention relates to a protein indicator and method for determining the presence of and estimating the amount of protein in various fluids such as industrial and body fluids. More particularly the invention relates to a novel diagnostic indicator that is especially useful for determining the presence and amount of albumin in specimens of human urine as an incident of the detection and treatment of individuals having kidney diseases. However, as the description proceeds it will become apparent that the present indicator can also be used to determine the albumin content of such fluids as blood plasma and serums, and more generally the protein content of many other protein-containing fluids as well.

Numerous methods and materials have been previously proposed for testing urine for the presence of proteins. In general these methods depend upon precipitation of the proteins either by adding to the urine one of the so-called alkaloidal reagents such as trichloroacetic acid, sulfosalicylic acid and the like, or by boiling the urine in the presence of dilute acetic acid. The formation of the precipitate indicates the presence of a protein and visual inspection of the amount of precipitate produced gives a rough idea of the amount of protein present. In order to make an accurate determination of the protein concentration, it is necessary to allow the urine containing the precipitate to settle for a long period of time or to centrifuge the suspension and measure the separated precipitate. These prior art methods are subject to the defect that other substances present in the urine may be precipitated with the protein and thus give a misleading result. Also these prior art methods are deficient in that they are not adequately specific to albumin but give a positive test in the presence of other proteins as well.

While more specific and accurate methods of analyzing quantitatively for albumin in urine are available, in general they are complicated and time-consuming procedures. To secure satisfactory results, special apparatus, skilled technicians and a well-equipped laboratory may be necessary. Such methods are not suitable for use at the bedside of a patient or in the average general practitioner's office.

There is thus a need for an improved simple and reasonably accurate method of determining the albumin content of human urine. Such a method would be useful not only in the diagnosis of diseases but also in the course of treatment of the disease to determine the effectiveness of the treatment.

It is therefore a principal object of the present invention to provide an improved method and means for detecting the presence of proteins, particularly albumin, in human urine. It is another object of the invention to provide an improved albumin-detecting reagent which will distinguish between albumin and some other proteins and will detect small amounts of albumin in body fluids. It is still another object of the invention to provide an improved reagent for detecting proteins in industrial fluids. It is a further object of the invention to provide an inexpensive, quick, convenient and relatively odor-free method and means for determining the presence and amount of protein in urine. It is a still further object of the invention to provide a colorimetric protein test that can be conveniently used by a physician or by a patient either in the physician's office or at the bedside of the patient. It is still another and particularly important object of the invention to provide a protein indicator in the form of a paper strip or tape which when wetted with a protein-containing solution changes color to indicate the presence and amount of protein present in the solution. Other objects and advantages of the invention will be in part obvious and in part pointed out hereafter.

In one of its broader aspects the present invention comprises an indicator for detecting the presence of protein which contains as its essential active ingredient a reagent that reacts with protein to produce a color change, preferably a visually perceptible color change, that is, a color change that is readily detectable by the eye without the use of color-measuring instruments. Such reagents are referred to herein for convenience as polychromatic substances. Many of the polychromatic substances that are useful in the present indicator are moderately complex organic compounds, e.g., dyes, which are acids or bases and ionize to produce anions or cations respectively that have a distinctly different color than the corresponding un-ionized acid or base. In some cases the un-ionized compound or the anions or cations produced therefrom may be colorless. Also the desired color change may involve a change in molecular weight or a tautomeric change in the polychromatic substance in the presence of protein. Particularly satisfactory results have been obtained with such polychromatic substances as bromphenol blue and bromcresol green.

Many of the acidic and basic dyes referred to above are pH indicators which are color-sensitive to changes in pH, and hence cannot be used directly as protein indicators. However, it has been found that if such compounds are combined with a sufficiently large amount of a properly selected buffer, a composition is obtained which when brought into contact with protein-containing fluids exhibits a color change that indicates accurately the concentration of protein present in the fluids. The composition comprising the protein-sensitive polychromatic substance and the buffer may be used in the form of an aqueous solution or, preferably, as described more fully below, it may be applied to a porous paper to provide a convenient testing medium in sheet or strip form.

It has been found that any of various known types of buffers can be used in the present composition. The function of the buffer is to maintain the composition substantially isohydric at the proper pH to produce the desired color change in the polychromatic substance in the presence of protein and to eliminate insofar as possible color changes due to variations in the pH of the protein-containing fluids being tested. It is thus evident that the amount of buffer used depends upon the nature of the solution being tested. The quantity of buffer usually falls between about 0.1 molar and 2 or 3 molar, although in particular cases it may be above or below this range. The nature of the buffer used will depend upon and vary with the type of polychromatic substance used. Thus if the polychromatic compound is color-sensitive to proteins within a pH range that is satisfactorily maintained constant by buffers comprising a weak acid and its salt, buffer systems such as a citric acid-sodium citrate, tartaric acid-sodium tartrate or a boric acid-sodium borate buffer may be used. It should be noted that composition buffered to pH values in the alkaline range are subject to the disadvantage that they tend to absorb carbon dioxide from the atmosphere and hence are not well suited for application to a test paper which may be stored for extended periods of time. For those polychromatic substances which are pH indicators that undergo color change at strongly acid pH's (pH of 4.0 and lower) acids alone, such as trichloracetic acid or sulfosalicylic acid may serve to set the pH of the medium at the pH required.

Although as indicated above the use of a buffer in the present composition is preferred, it is not essential in all cases. For example, in special cases it may be desirable to add a buffer to the protein-containing fluid before the polychromatic compound is brought into contact therewith. Also the fluid to be tested may already contain a buffer of the proper type and in the proper amount to maintain the system isohydric at the desired pH or the polychromatic substance may be insensitive to pH changes. In such cases the present indicator may comprise a polychromatic compound as its sole active ingredient.

In preparing the present protein indicators the polychromatic substance and buffer are dissolved in water or other suitable solvent. While the solution may be added as such to the protein-containing fluid, it is preferable to prepare a test paper from the solution. Such test papers can be readily made by saturating a porous paper such as filter paper with the solution and drying in air, either with or without heating, to deposit a mixture of the polychromatic substance and buffer in the pores of the paper. Where the nature and amount of the buffer is such that crystallization may occur, freshly prepared hot solutions should be used. For convenient use, the paper can be made in long strips or tapes that are rolled up and inserted in suitable roll-tape dispenser.

In carrying out a preferred embodiment of the present method, the test paper as thus prepared is dipped momentarily into the protein-containing liquid, the time of immersion being sufficient to saturate the paper thoroughly with the test liquid. After the lapse of 15 to 60 seconds to permit the color change to develop fully, the extent of color change is determined. In many cases simple visual observation of the test paper will provide the desired information. If more accurate information is required, a color chart may be prepared for the particular polychromatic substance used in the test paper and bearing color spots corresponding to various known protein concentrations. The color of the test paper can then be compared with the color spots on the chart to determine the protein concentration of the fluid tested. If a still more accurate determination is required or if the polychromatic substance is of such a character that it undergoes only a slight change in color a spectrophotometer or colorimeter can be used to determine the color change.

To achieve satisfactory results with indicator compositions of the type referred to above, it is important that the pH of the composition be maintained at a predetermined value within relatively narrow limits. In cases where the polychromatic substance used is selected from the preferred group of pH indicators referred to above, although color changes due to protein occur within the pH range of the indicator, it has been found that the pH of the protein indicator composition should, for optimum results, be maintained at a value slightly below, but only slightly below, the range in which the compound is normally used as a pH indicator.

It should further be noted that the optimum value of pH depends not only upon the type of polychromatic compound used but also to lesser extent on the type of buffer employed and its ionic strength. The precise pH value to which a given polychromatic substance should be buffered with a particular buffer to give optimum results can readily be determined by experiment. A convenient method of establishing the correct pH will be described with reference to a composition containing bromphenol blue as a polychromatic compound and a malonic acid-malonate buffer. Since bromphenol blue is one of the preferred groups of indicators referred to above, it should be buffered to a value below its normal pH range. For many buffers optimum results are obtained with bromphenol blue at pH values of about 2 to 3. To determine the optimum conditions for the malonic acid-malonate buffer, 1 gram of malonic acid is dissolved in 10 ml. of a 0.04% solution of bromphenol blue to form a solution that is initially yellow. A suitable alkali such as sodium hydroxide or sodium bicarbonate is then added until the solution turns slightly orange. Test strips are made from this solution as described above and tested in urine specimens containing respectively substantially no protein and a small known quantity, say 0.5% of albumin. If the strip that is dipped in the protein-free specimen becomes appreciably darker it is an indication that too much alkali has been added and the pH of the original solution should be lowered slightly by addition of acid thereto. If the strip that is dipped in the protein-containing specimen shows no color change or only a slight color change, this fact indicates that insufficient alkali has been added and that the pH should be raised somewhat. It is evident that these two tests effectively bracket the optimum pH value and make it possible to arrive readily at a value which will give a negative indication in the absence of protein and a marked color change in the presence of protein. For convenience the foregoing procedure is referred to in the examples given below as the pH adjusting procedure.

The reactivity of many proteins is enhanced by denaturation of the protein. Denaturation can be brought about by a high salt concentration such as is present in many of the examples given below, due to the high concentration of buffer present. Also, highly acid solutions have the effect of acting to denature many proteins. Such denaturation may result in precipitating the protein from its solution. It is thus evident that in some of the examples given below the buffers may perform a dual role in that they both maintain the pH of the system constant, and act to denature the protein as well.

Certain acid substances some of which are commonly regarded as protein precipitants and denaturants, such as trichloracetic acid and sulfosalicylic acid, also act as buffers in the sense that they provide a highly acid medium which does not change its pH substantially on addition of small amounts of alkali. Moreover, in some cases the polychromatic substance may also act as a protein denaturant. If neither the polychromatic substance nor the buffer acts as a denaturant, it may be advantageous to add a protein denaturant as an independent component of the present composition. Many substances which are known to denature proteins may be employed, e.g. salts of heavy metals, urea in high concentrations, alkaloidal reagents referred to above, salts in high concentrations, high acidities and alkalinities, various detergents and other known denaturing agents.

In order to point out more fully the nature of the present invention the following specific examples will be given of typical compositions falling within the scope of the invention:

Example 1

A protein indicator was prepared by dissolving 10 grams of citric acid monohydrate and 800 mg. of sodium citrate dihydrate in 100 ml. of 0.04% aqueous bromphenol blue. Strips of Whatman No. 41 filter paper were dipped in this solution and dried in air at room temperature.

A series of test solutions were prepared by dissolving in normal urine specimens various quantities of Armour bovine plasma albumin. Pieces of test paper prepared as described were dipped momentarily in each of the test solutions and the color observed visually at the end of 15 to 20 seconds with results given below.

| Percent protein: | Color of paper |
|---|---|
| 0 | Yellow. |
| 0.05 | Greenish yellow. |
| 0.15 | Green. |
| 0.3 | Bluish green. |
| 0.6 | Greenish blue. |
| 2.5 | Blue. |

From the foregoing results it is apparent that the protein indicator prepared as described gives a very sensitive and accurate indication of the presence of albumin in urine. Other tests with this indicator paper have shown that it is quite specific to albumin and that it is substantially non-responsive to other proteins such as gamma globulin.

Example 2

One milliliter of the solution of Example 1 into which the filter paper was dipped was mixed with 6 milliliter samples of urine containing varying amounts of protein. It was found that the protein content of the samples was indicated by readily visible color changes.

The following examples set forth compositions which have been used in preparing test papers as in Example 1, which test papers give satisfactory color changes in the presence of protein. All solutions are aqueous unless otherwise indicated.

Example 3

| | Ml. |
|---|---|
| Thymol blue (0.04%) | 3 |
| Sulfosalicylic acid (41 g./100 ml.) | 1 |
| Potassium carbonate (0.2 M) | 1 |

Example 4

| | Ml. |
|---|---|
| Thymol blue (0.04%) | 1 |
| 7 g. borax and 7 g. washing soda in 130 ml. of water | 1 |

Example 5

| | |
|---|---|
| Bromphenol blue (0.04%) | ml 6 |
| Malonic acid | g 1 |
| (dissolved in enough water to form 6 ml. of solution) | |

3 N sodium hydroxide added until orange pink color develops. Then pH adjusting procedure used to achieve optimum pH.

Example 6

| | Ml. |
|---|---|
| Bromphenol blue (0.04%) | 7.5 |
| Sulfosalicylic acid (15%) | 2.5 |

3 N sodium hydroxide added until orange color develops. Then pH adjusting procedure used to achieve optimum pH.

Example 7

| | |
|---|---|
| Bromcresol green (0.1% in 30% ethanol) ml | 10 |
| Citric acid monohydrate g | 1.5 |
| Trisodium citrate dihydrate g | 1 |

Example 8

| | |
|---|---|
| Bromcresol green (0.1% in 30% ethanol) ml | 10 |
| Citric acid monohydrate g | 2.1 |
| Sodium citrate dihydrate g | 1 |
| Water ml | 16 |

This solution can be used not only for the preparation of test papers but also for direct addition to a protein-containing solution as in Example 2.

Example 9

| | Ml. |
|---|---|
| Bromphenol blue (0.05%) | 5 |
| Tartaric acid (2 M) | 9.8 |
| Sodium tartrate dihydrate (2 M) | 2.5 |

This solution is preferably applied to the paper hot to avoid crystallization.

Example 10

| | Ml. |
|---|---|
| Bromphenol blue (0.05%) | 5 |
| Tartaric acid (2 M) | 9.8 |
| Sodium tartrate dihydrate (2 M) | 4 |

This solution is preferably applied to the paper hot in order to avoid crystallization.

Example 11

| | |
|---|---|
| Bromphenol blue (0.02%) ml | 20 |
| Malonic acid g | 5 |
| Sodium bicarbonate g | 3 |

Example 12

| | |
|---|---|
| Bromcresol green (0.1% in 30% ethanol) | 4 |
| Tartaric acid (2 M) | 5 |
| Sodium tartrate dihydrate (2 M) | 4 |

This solution is preferably applied to the paper hot in order to avoid crystallization.

Example 13

| | Ml. |
|---|---|
| Sodium alizarine sulfonate (0.1%) | 4 |
| 3 ml. of a solution of 100 g. citric acid monohydrate and 8 g. sodium citrate dihydrate in 500 ml of water. | |
| Sodium citrate (1 N) | 6 |

Example 14

| | |
|---|---|
| Alizarine (0.1%) | 4 |
| 3 ml. of a solution of 100 g. citric acid monohydrate and 8 g. sodium citrate dihydrate in 500 ml. of water. | |
| Sodium citrate (1 N) | 6 |

Example 15

| | |
|---|---|
| Thymol blue (0.04%) | 17 |
| Sulfosalicylic acid (41 g./100 ml.) | 3 |

Example 16

| | |
|---|---|
| Thymol blue (0.04%) | 17 |
| Trichloracetic acid (14%) | 8.5 |

Example 17

| | |
|---|---|
| Methyl violet 5B (0.04%) | 10 |
| Sulfosalicylic acid (41 g./100 ml.) | 2.5 |

Example 18

| | |
|---|---|
| Methyl violet 5B (0.04%) | 10 |
| Trichloracetic acid (14%) | 5 |

It is of course to be understood that the foregoing examples are illustrative only and that numerous changes can be made in the ingredients, conditions and proportions set forth without departing from the spirit of the invention as set forth in the appended claims.

I claim as my invention:

1. An indicator for indicating the presence and amount of protein in a fluid by means of color changes in said indicator when contacted with a protein-containing fluid, said indicator comprising a piece of absorbent paper having deposited therein (1) a polychromatic substance changing color on reaction with protein and adaptable to use as a pH indicator, and (2) a solid buffer for maintaining said indicator, when it is contacted with a protein-containing fluid, substantially isoyhdric at a pH at which said substance changes color in the presence of protein but which is below the pH range within which said substance is adaptable to use as a pH indicator.

2. An indicator according to claim 1 and wherein said polychromatic substance is bromphenol blue.

3. An indicator according to claim 1 and wherein said polychromatic substance is bromcresol green.

4. An indicator according to claim 1 and wherein said polychromatic substance is thymol blue.

5. An indicator according to claim 1 and wherein said polychromatic substance is methyl violet 5B.

6. An indicator according to claim 1 and wherein said polychromatic substance is sodium alizarine sulfonate.

7. An indicator according to claim 1 and wherein said buffer is essentially composed of citric acid and a water-soluble citrate.

8. An indicator according to claim 1 and wherein said buffer is essentially composed of tartaric acid and a water-soluble tartrate.

9. A dry test paper for indicating the presence and estimating the quantity of albumin in urine by means of color changes in said paper in the presence of albumin, which test paper comprises a piece of absorbent paper having deposited therein (1) a polychromatic dye changing color on reaction with protein, said dye being a substance adaptable to use as a pH indicator, and (2) a solid buffer for maintaining said dye substantially isohydric, in the presence of urine, at a pH at which said dye changes color in the presence of protein but which is below the pH range within which said substance is adaptable to use as a pH indicator.

10. A method for determining the presence and amount of protein in a fluid by means of color changes in a protein-sensitive polychromatic substance, which comprises contacting said fluid with a piece of porous paper having deposited therein (1) a polychromatic substance changing color on reaction with protein and adaptable to use as a pH indicator, and (2) a solid buffer for maintaining said indicator, when it is contacted with a protein-containing fluid, substantially isohydric at a pH at which said substance changes color in the presence of protein but which is below the pH range within which said substance is adaptable to use as a pH indicator, removing the paper from said fluid, and visually comparing its color with a color chart having color indications thereon corresponding with the coloration obtained with known amounts of protein.

References Cited

UNITED STATES PATENTS

| | | | |
|---|---|---|---|
| 2,848,308 | 8/1958 | Free | 23—253 |
| 2,862,796 | 12/1958 | Gomberg | 23—253 |

OTHER REFERENCES

Cohn: Indicators and Test Papers, pp. 180, 181, 207, 208 (1899).

Feigl: Mikrochimica Acta, vol. II, pp. 107–110 (1947).

Kolthoff: Acid-Base Indicators, pp. 350–353, 368, 369, 265–268 (1937).

Ishidate Ber. Deutsch. Chem. Gesellschaft, vol. 74, pp. 163–173 (1941).

Aira Ketomoa: Ann. Med. Exptl. et Biol. Fennial 30, pp. 249–253 (1952).

Abstracts of Papers, 131st Meeting Amer. Chem. Soc. (Florida), No. 169–171 (pp. 77C, 76C of Meeting) (1957).

JOSEPH SCOVRONEK, Primary Examiner

U.S. Cl. X.R.

23—253; 252—408

Disclaimer and Dedication

3,485,587.—*Albert S. Keston,* Weehawken, N.J. PROTEIN INDICATOR. Patent dated Dec. 23, 1969. Disclaimer and Dedication filed June 20, 1980, by the assignee, *Miles Laboratories, Inc.*

Hereby disclaims and dedicates to the Public the term of this patent subsequent to June 20, 1980.

[*Official Gazette August 26, 1980.*]